(12) United States Patent
Feng et al.

(10) Patent No.: US 7,724,322 B2
(45) Date of Patent: May 25, 2010

(54) VIRTUAL SOLAR LIQUID CRYSTAL WINDOW

(75) Inventors: Xiao-Fan Feng, Vancouver, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 106 days.

(21) Appl. No.: 11/903,402

(22) Filed: Sep. 20, 2007

(65) Prior Publication Data

US 2009/0079907 A1    Mar. 26, 2009

(51) Int. Cl.
   *G02F 1/1335* (2006.01)
(52) U.S. Cl. .............. 349/68; 349/114; 349/67
(58) Field of Classification Search ............ 349/65, 349/114, 102
   See application file for complete search history.

(56) References Cited

U.S. PATENT DOCUMENTS

| | | | |
|---|---|---|---|
| 5,572,343 A | | 11/1996 | Okamura et al. |
| 5,581,447 A | * | 12/1996 | Raasakka ............. 362/557 |
| 6,597,346 B1 | | 7/2003 | Havey et al. |
| 7,110,062 B1 | * | 9/2006 | Whitted et al. ............ 349/68 |
| 7,199,934 B2 | | 4/2007 | Yamasaki |
| 7,360,934 B2 | * | 4/2008 | Sakurada ............ 362/553 |
| 2002/0050974 A1 | * | 5/2002 | Rai et al. ............. 345/102 |
| 2004/0070611 A1 | | 4/2004 | Tanaka et al. |
| 2004/0207786 A1 | * | 10/2004 | Whitted et al. .......... 349/114 |
| 2006/0028400 A1 | | 2/2006 | Lapstun et al. |
| 2008/0198298 A1 | * | 8/2008 | Jeong et al. ............ 349/65 |
| 2009/0213041 A1 | * | 8/2009 | Unger et al. ............ 345/52 |

OTHER PUBLICATIONS

Ronen Gvili, et al., "Depth Keying," Proc. Of SPIE Electronic Imaging, vol. 5006, 2003, pp. 564-574.
Solomon Boulos, et al., "Packet-based Whitted and Distribution Ray Tracing," Proc. Of Graphics Interface 2007, vol. 234, pp. 177-184.
Michael Brown, et al., "Camera-Based Calibration Techniques for Seamless Multiprojector Displays," IEEE Transactions on Visualization and Computer Graphics, vol. 11, No. 2, pp. 193-206, 2005.
Ian Fasel, et al., "A Generative Framework for Real Time Object Detection and Classification," Computer Vision and Image Understanding, vol. 98, No. 1, 31 pp., 2005.
Phil Harman, et al., "Rapid 2D to 3D Conversion," Proc. Of SPIE, vol. 4660, pp. 78-86, 2002.
Derek Hoiem, et al. "Automatic Photo Pop-up," Proc. Of ACM SIGGRAPH, pp. 577-584, 2005.
Wijnand Ijsselsteijn, et al., "Looking At or Looking Out: Exploring Monocular Cues to Create a See-Through Experience with a Virtual Window," Proc. Of Presence, pp. 83-92, 2006.

(Continued)

*Primary Examiner*—Frank G Font
*Assistant Examiner*—Eric Wong
(74) *Attorney, Agent, or Firm*—Chernoff, Vilhauer, McClung & Stenzel

(57) ABSTRACT

A display system includes a building, a wall enclosed within the building, and a light guide directing light from the exterior of the building to the wall within the building. A display is supported proximate the wall where the display includes a liquid crystal layer and not including a backlight. The light guide directing the light to the liquid crystal layer is in such a manner that the combination of the light and the liquid crystal layer results in an image displayed thereon.

20 Claims, 4 Drawing Sheets

OTHER PUBLICATIONS

Byungil Jeong, et al., "High-Performance Dynamic Graphics Streaming for Scalable Adaptive Graphics Environment," ACM/IEEE Supercomputing Conference, pp. 24-32, 2006.

Baoxin Li, et al., "Adaptive Display Color Correction Based on Real-time Viewing Angle Estimation," SID, vol. 35, No. 1, pp. 330-333, 2004.

Point Grey Research, "Bumble Bee 2 stereo vision camera," http://www.ptgrey.com/products/bumblebee2/bumblebee2_xb3_datasheet.pdf last accessed on Dec. 13, 2007.

Z. Zhang, "A flexible new technique for camera calibration," IEEE Transactions on Pattern Analysis and Machine Intelligence, vol. 22, No. 11, pp. 1330-1334, 2000.

* cited by examiner

VIRTUAL SOLAR LIQUID CRYSTAL WINDOW

CROSS-REFERENCE TO RELATED APPLICATIONS

Not applicable.

BACKGROUND OF THE INVENTION

The present invention relates to a liquid crystal display that incorporates solar light.

Liquid crystal panels have been mounted in a picture frame together with a connector. The connector is suitable for a compact flash card to be inserted that includes stored photographs. One or more of the images on the compact flash card are displayed on the liquid crystal panel within the picture frame. In some cases the picture frame includes a battery that powers the liquid crystal material and the backlight of the liquid crystal panel. Unfortunately, the battery tends to be drained relatively quickly by the power requirements of the liquid crystal panel.

Large liquid crystal panels are being used for the presentation of video content and for the presentation of digital photographs. The liquid crystal panels include a layer of liquid crystal material which acts to selectively permit light to be emitted from the panel, and a backlight behind the liquid crystal layer provides the light. Large liquid crystal displays consume a significant amount of energy thereby costing significant amounts of money to operate. In addition, the liquid crystal display heats up the room it is operating in which requires additional energy, at added expense, to adequately cool.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
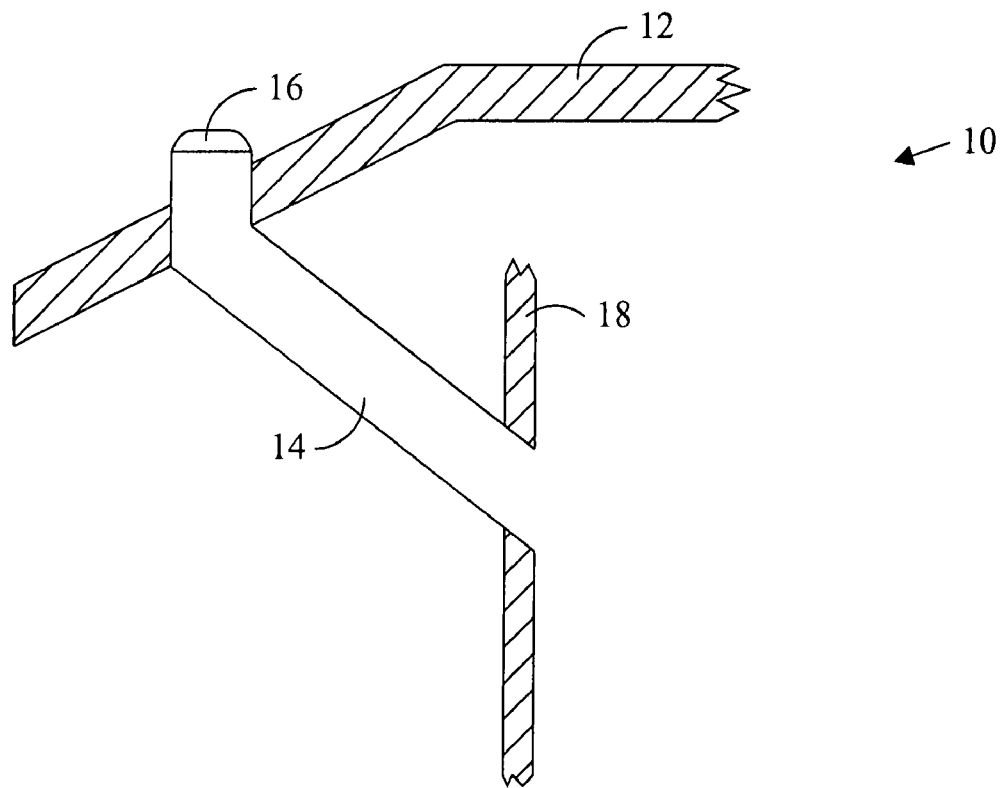
FIG. 1 illustrates a light pipe to a roof.

Referring to FIG. 1, a building 10 includes a roof 12 though which is routed a tubular pipe 14. A transparent cap 16 encloses the top of the tubular pipe 14. Sunlight from outside the building 10 enters the transparent cap 16 and travels down the pipe 14 terminating at a wall 18 therein. The pipe 14 may likewise receive sunlight through any opening in the building 10, such as a side wall. In this manner, light from outside of the building 10 is guided to an interior wall 18 within the building.

The building 10 may be any suitable structure, a part of which is exposed to sunlight. The tubular pipe 14 may be any light guide that directs light from a first location, such as the exterior of the building 10, to the interior of the building, such as the side wall 18. The transparent cap 16 may be any suitable cover so that rain does not collect in the tubular pipe 14. The tubular pipe 14 may be a metal reflective cylinder, a plastic reflective cylinder, or any type of light guide, with any cross section, such as circular, rectangular, triangular, or irregular.

Figure 2:
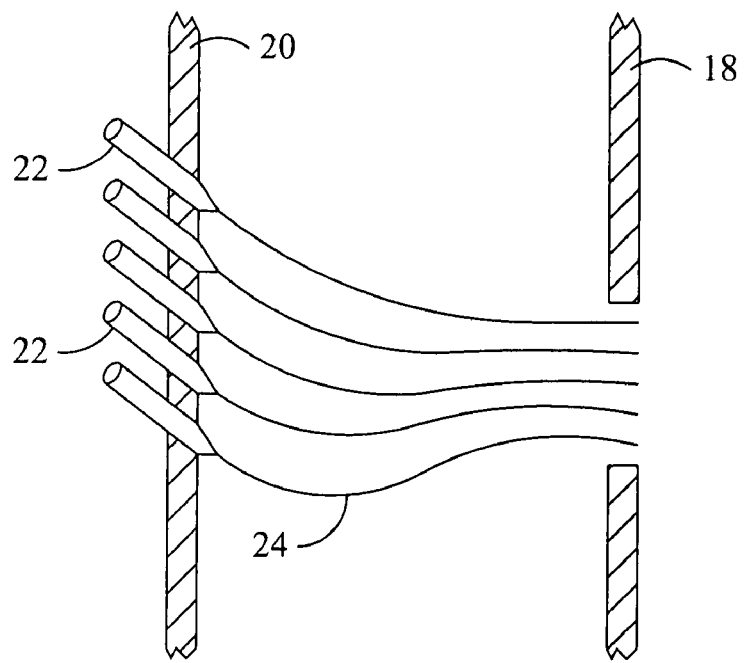
FIG. 2 illustrates a plurality of light pipes to a wall.

Referring to FIG. 2 another type of light guide may include a set of tubular light guides 22 exposed to sunlight from the exterior wall 20 of the building 10. The light guides 22 may be coupled to respective fiber optic light guides 24. The fiber optic light guides 24 terminate at an opening in the side wall 18. In some cases, the light in different fiber optic 24 light guides will have a different intensity or different color composition. In this case, the light terminating at the wall 18 therein tends to be non-uniform.

Figure 3:
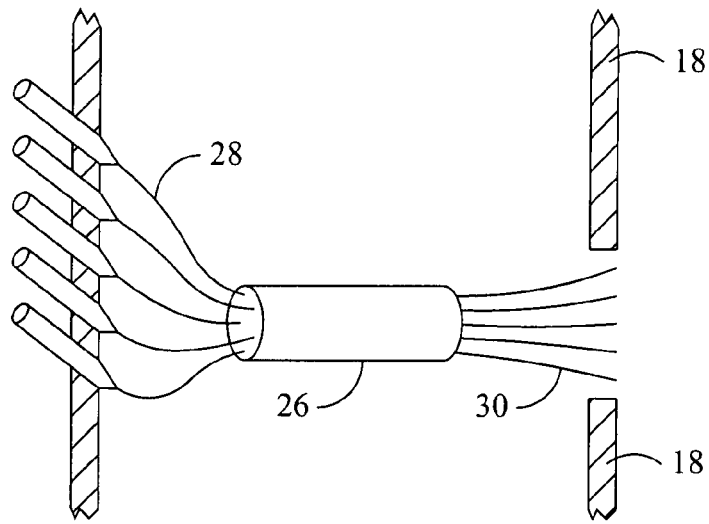
FIG. 3 illustrates the combination of a plurality of light pipes.

Referring to FIG. 3, in order to increase the light uniformity, light guides 28 may be concentrated within a single combined light guide 26. The light within the single combined light guide 26 operates to combine the light together within the single combined light guide. The combining of the light within the light guide 26 acts to even out the intensity distribution and color composition of the light. The light within the light guide 26 may thereafter be separated into separate light guides 30 which will tend to be uniform in intensity and uniform in color composition. In this manner, the light guides 26, 28, and 30 collect light from outside the building and guide the light to the wall 18 in a substantially uniform manner.

Figure 4A:
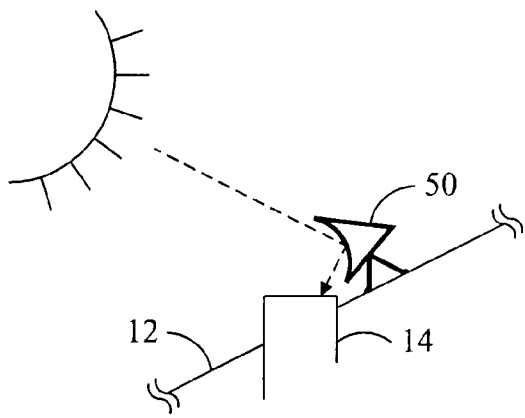
FIGS. 4A-4C illustrates light collecting devices.
Figure 4B:
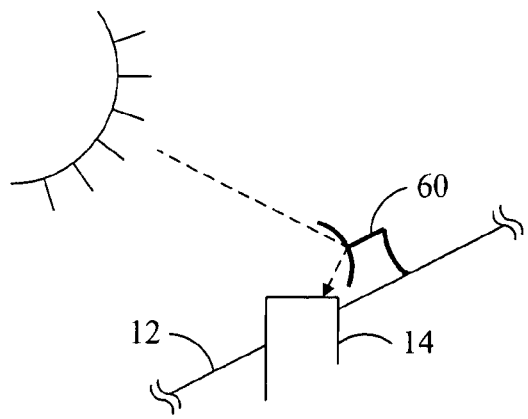
Figure 4C:
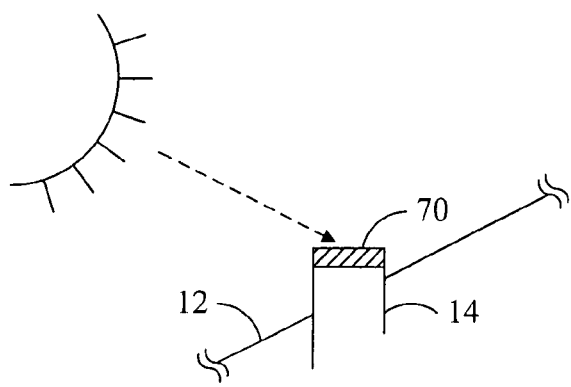

Referring to FIG. 4A, the exterior wall 20 of the building 10 may include additional light directing structures to increase the ability of the light guides to collect sunlight. One such light directing structure may be a heliotropic tracking system 50. The heliotropic tracking system 50 may include a dish based reflector that directs light to the light guides and generally follows the sunlight to increase light. Referring to FIG. 4B, another such light directing structure may include a fixed parabolic mirror 60. Alternatively, the mirror 60 may be a set of lens that directs light into respective light guides. The set of lenses, may if desired, be movable with the movement of the sun to increase the light capture. The parabolic mirror 60 directs light to the light guide. Referring to FIG. 4C, another such light directing structure may include a lens 70, such as a Fresnel lens.

Figure 5:
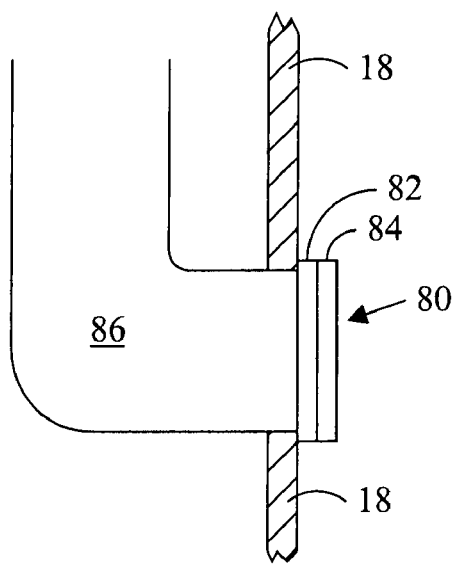
FIG. 5 illustrates a light pipe and a display.

Referring to FIG. 5, the wall 18 may be used to hang a liquid crystal display 80 on or otherwise to support a liquid crystal display against. The liquid crystal display 80 preferably covers all or substantially all of the opening in the wall 18. In addition, the light guide is aligned with the opening in the wall 18 to illuminate the opening preferably in a substantially uniform manner. The backlight included in the liquid crystal display 80 tends to use a substantial amount of electricity and tends to heat up the room, thus requiring additional electricity to cool the room.

Figure 6:
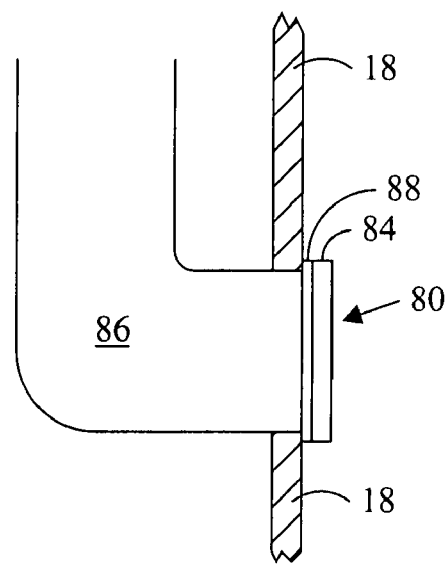
FIG. 6 illustrates a light pipe and a display without a backlight.

With the liquid crystal display 80 positioned in a manner consistent with the opening defined by the wall 18, together with an ambient light source behind, it was determined that the backlight 82 may be from the liquid crystal modulation layer 84 of the liquid crystal display 80. As a general matter, sometimes the LCD is referenced as a liquid crystal display which includes a liquid crystal modulation layer, a color filter array, a diffusion layer, and a backlight. A panel is sometimes referenced as a LCD without the backlight. Referring to FIG. 6, the liquid crystal display 80 may include the liquid crystal layer 84 without the backlight 82 and use light from the light pipe 86 to illuminate the liquid crystal display 80. In this configuration, the liquid crystal display 80 requires substantially less electricity because the ambient light acts as a backlight. A diffuser 88 is used to further even out the illumination to the liquid crystal layer 84.

Figure 7:
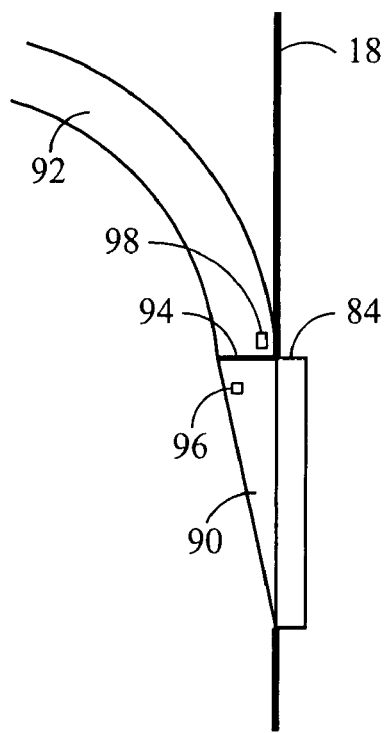
FIG. 7 illustrates a v-shaped light distribution structure for a display without a backlight.

Referring to FIG. 7, the light may be provided by a light guide 92 (from outside the building) near the top (or bottom) of the display 80 which is spread out in a substantially uniform manner across the display 80 by using a generally v-shaped structure 90. The V-shape is used so that controlled TIR (total internal reflection) occurs inside the guide, and the light escapes only where desired—in this case uniformly across the passive backlight. Other structures may likewise be used to spread out the light from the light guide 92 to the back of the display 80. In full daylight the amount of sunlight being provided to the display 80 may be greater than what is desired in order to effectively display an image on the display 80. In order to adjust the amount of light reaching the display 80, a light sensor 96 may be used as the basis to adjust the amount of light to be provided to the display 80 from an adjustable light filter 94. A neutral density filter is one approach, and a color-corrective filter may also be used. In low sunlight conditions, the light sensor 96 preferably permits all of the light to pass through the light filter 94 to the display 80. In dim or dark sunlight conditions, an additional light source 98 may be used to provide additional illumination to the display 80. The light sensor 96 may be used to determine when the additional light source 98 is desirable to illuminate the display 80. If too much light results from the combination of the light source 98 and any sunlight, then the light filter 94 may be used to adjust the light level to the appropriate level. The filter 94 may make the adjustment automatically or by viewer adjustment.

Figure 8:
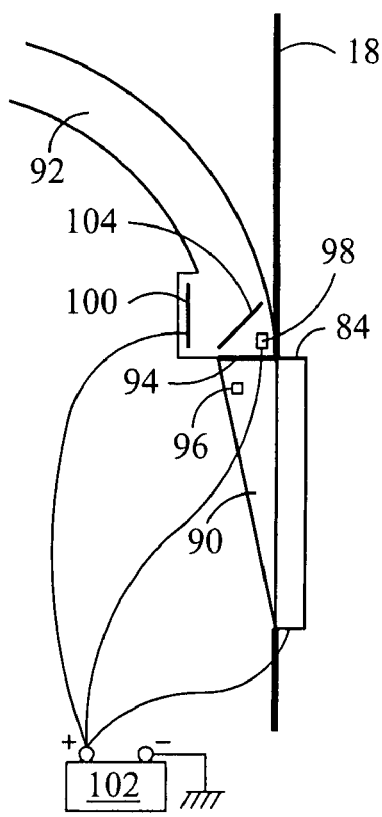
FIG. 8 illustrates a photo cell together with a display without a backlight.

Referring to FIG. 8, a photo cell 100 may be included that charges a battery 102 using part of the sunlight provided by the light guide 92. Preferably the photo cell 10 is made of amorphous poly-silicon silicon or silicon crystal. A mirror or partially reflecting plate 104 may be used to direct all or part of the incoming light to the photo cell 100. The mirror or plate 104 may be selectively oriented or swung out the way so that the light is not substantially inhibited from reaching the display 80. The system can be set up so the mirror acts to charge the photo cell when the display is turned off. The battery 102 may be used to selectively provide power to illuminate the light source 98, when desired. The battery 102 may also be used to selectively provide power to operate the liquid crystal layer 84. The photo cell 100 may also be used to provide power directly to the liquid crystal layer 84.

As illustrated in FIG. 8, the power for the display 80 may be provided exclusively by the battery 102 and photo cell 100. In this manner, no additional electricity is required in order to operate the display 80, other than that available from sunlight.

Figure 9:
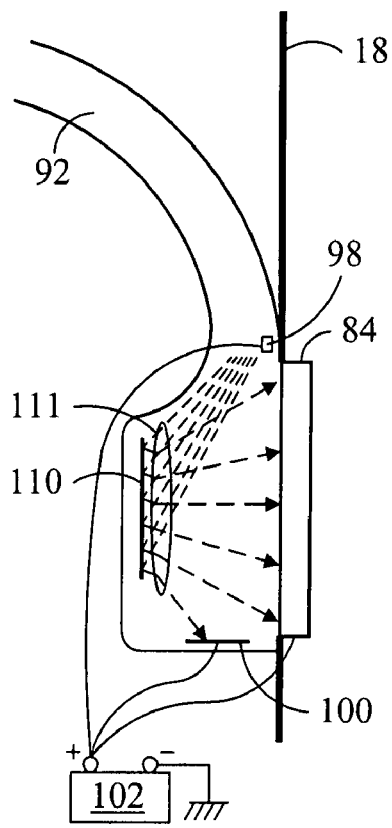
FIG. 9 illustrates a digital micromirror device, a photo cell, together with a display without a backlight.

Referring to FIG. 9, another configuration may include light from the light guide 92 being directed at a digital micromirror device 110, together with a lens 111, which is used to deflect light onto the liquid crystal layer 84. The device 110 may deflect light onto the liquid crystal layer 84 in a generally uniform manner, while also deflecting sufficient light onto the photo cell 100 to charge the battery 102 and/or operate the liquid crystal layer 84 and/or operate the light source 98.

Figure 10:
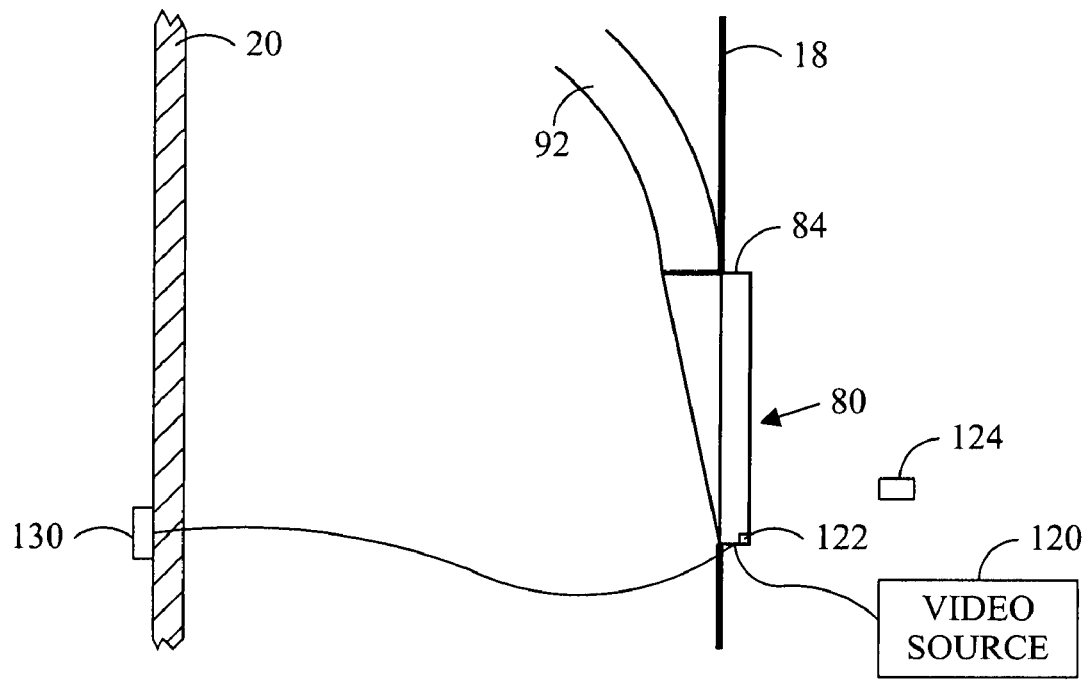
FIG. 10 illustrates a display without a backlight together with an exterior image source.

Referring to FIG. 10, the display 80 may include a video source 120 so that viewers may watch a video or view an image on the display 80. Also, the display 80 may include a slot 122 in which is placed a memory card 124 containing image files and/or video files to be presented on the display 80. In this manner, the viewer may be able to present images on the display 80 without the need for the backlight 82 nor external power sources.

Another embodiment includes include a motion sensor and face detector to determine if anyone is watching the display. If the display is not being watched, it switches over to the mode for charging the solar panel.

An external image capture device 130 may be attached to the wall 20 that obtains images of the outside of the building 10. These images may be presented on the display 80, so that the inside of the wall 18 will have an image of the outside of the building 10. In this manner, the outside can be brought inside without the use of additional power sources.

The external image capture device 130 may be wirelessly interconnected to the display. In some cases, the image capture device 130 may be remotely located from the building and interconnected using some network, such as the Internet. A remote camera is suitable for displaying live scenes from a beach, sports events, etc.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A display system comprising:
   (a) a building;
   (b) a wall enclosed within said building that includes a vertical portion through which light may emanate;
   (c) a light guide directing light from the exterior of said building to emanate through said vertical portion of said wall;
   (d) a display supported proximate said wall and positioned at least partially in front of said vertical portion;
   (e) said display including a liquid crystal layer;
   (f) said light guide directing said light to said liquid crystal layer in such a manner that substantially all of said light directed by said light guide from said exterior of said building provides illumination to said liquid crystal layer, and the combination of said illumination and said liquid crystal layer results in an image displayed thereon.

2. The display system of claim 1 wherein said light guide is a tubular cylinder.

3. The display system of claim 1 wherein said light guide includes fiber optics.

4. The display system of claim 1 further comprising a transparent cover on said light guide at said exterior of said building.

5. The display system of claim 1 wherein said light guide includes a plurality of light guides.

6. The display system of claim 5 wherein said plurality of light guides are combined into a single light guide.

7. The display system of claim 1 wherein said light directed to said liquid crystal layer is substantially uniform.

8. The display system of claim 1 further comprising a light collecting structure to direct additional light to said light guide.

9. The display system of claim 1 further comprising a diffuser between said light guide and said liquid crystal layer.

10. The display system of claim 1 further comprising a light source to provide generated light to said liquid crystal layer different from that provided by said light guide.

11. The display system of claim 1 further comprising a light sensor to sense the intensity of the light.

12. The display system of claim 11 wherein a filter is adjusted in response to said intensity of said light.

13. The display system of claim 1 further comprising a photo cell sensing said light.

14. The display system of claim 13 wherein power from said photo cell is used to operate said liquid crystal layer.

15. The display system of claim 10 wherein power from a photo cell is used to operate said light source.

16. The display system of claim 4 wherein said cover includes a lens.

17. The display system of claim 16 wherein said lens is a Fresnel lens.

18. The display system of claim 1 wherein said power from said photo cell is used to charge a battery.

19. A display apparatus comprising:
(a) a liquid crystal array having a first surface for displaying an image and a second surface parallel to said first surface for receiving light to display said image; and
(b) a backlight comprising a light guide having a first member for collecting light and supported by an exterior surface of a building, and a second member directing substantially all of said light from said first member to impinge on said second surface, where said second member is at least partially supported by an interior surface of said building.

20. A display apparatus comprising:
(a) an external housing supporting a liquid crystal layer having a front surface for displaying an image and a rear surface for receiving light to display said image; where
(b) said external housing includes an aperture substantially aligned with said rear surface of said liquid crystal layer, and shaped to receive light from a light source mounted in a vertical wall of a building such that the whole of said rear surface is impinged by said light.

* * * * *